United States Patent
Peacos, III et al.

(10) Patent No.: US 9,452,381 B2
(45) Date of Patent: Sep. 27, 2016

(54) MODULAR CANISTER MODULES FOR AIR SEPARATION SYSTEMS

(71) Applicant: Hamilton Sundstrand Corporation, Windsor Locks, CT (US)

(72) Inventors: Frederick Peacos, III, North Scituate, RI (US); Kenneth Crawford, Manchester, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 14/587,287

(22) Filed: Dec. 31, 2014

(65) Prior Publication Data
US 2016/0184761 A1    Jun. 30, 2016

(51) Int. Cl.
| B01D 53/02 | (2006.01) |
| B01D 53/04 | (2006.01) |
| B64D 13/06 | (2006.01) |
| B64D 37/00 | (2006.01) |
| B64D 37/32 | (2006.01) |

(52) U.S. Cl.
CPC .......... B01D 53/0415 (2013.01); B64D 13/06 (2013.01); B64D 37/005 (2013.01); B64D 37/32 (2013.01); *B01D 2259/4575* (2013.01); *B64D 2013/0651* (2013.01); *B64D 2013/0681* (2013.01)

(58) Field of Classification Search
CPC .. B01D 2313/20; B01D 53/22; B01D 63/02; Y10T 29/49815
See application file for complete search history.

(56) References Cited

U.S. PATENT DOCUMENTS

| 5,013,331 | A  | * | 5/1991  | Edwards  | B01D 53/22 95/22 |
| 2004/0065778 | A1 | * | 4/2004  | Jones    | B64D 37/32 244/135 R |
| 2005/0115404 | A1 | * | 6/2005  | Leigh    | B01D 53/0454 95/11 |
| 2007/0023577 | A1 | * | 2/2007  | Jones    | B64D 37/32 244/135 R |
| 2007/0054610 | A1 | * | 3/2007  | Jensen   | B64D 37/32 454/74 |
| 2010/0024649 | A1 | * | 2/2010  | Semmere  | B01D 63/02 96/8 |
| 2012/0304856 | A1 | * | 12/2012 | Kanetsuki | B01D 63/023 95/47 |
| 2012/0312162 | A1 | * | 12/2012 | Theodore | B01D 63/022 95/47 |

FOREIGN PATENT DOCUMENTS

WO    0067885    11/2000

OTHER PUBLICATIONS

International Search Report, International Application No./Patent No. 15203241.3-1754, Date of Mailing May 4, 2016, European Patent Office, International Search Report 5 pages.

* cited by examiner

*Primary Examiner* — Christopher P Jones
(74) *Attorney, Agent, or Firm* — Cantor Colburn LLP

(57) ABSTRACT

An air separation system is provided that includes at least one air separation module having a first end and a second end and at least one mounting assembly removably connected the at least one air separation module and configured to mount the at least one air separation module in an aircraft. The at least one mounting assembly includes a first end cap removably connected to the first end of the at least one air separation module, a second end cap removably connected to the second end of the at least one air separation module, and at least one bracket configured to removably connect one of the first end cap and the second end cap to an aircraft.

11 Claims, 4 Drawing Sheets

MODULAR CANISTER MODULES FOR AIR SEPARATION SYSTEMS

BACKGROUND OF THE INVENTION

The subject matter disclosed herein generally relates to the field of air separation canister systems, and more particularly to modular installation and removal modules for air separation canister systems.

Air separation systems on aircraft utilize the pressure differential between air inside of the aircraft and air outside of the aircraft to separate air, such as cabin air or bleed air, into a first fraction that is slightly enriched with oxygen and a second fraction that is highly enriched with nitrogen. The nitrogen rich air is supplied to the fuel tanks of the aircraft and used to provide an inert atmosphere inside the fuel tanks as fuel is consumed.

Traditional air separation modules include canisters that are mounted within a frame assembly and the frame assembly is mounted into an aircraft. One or more canisters may be integrally connected with the frame assembly. To remove and/or change a canister that is part of one of these systems, the entire frame assembly must be removed from the aircraft. As the frame assemblies, with integral canisters, are heavy and bulky, the process for removing and/or changing the canisters may be difficult and/or time consuming.

BRIEF DESCRIPTION OF THE INVENTION

According to one embodiment, an air separation system is provided that includes at least one air separation module having a first end and a second end and at least one mounting assembly removably connected the at least one air separation module and configured to mount the at least one air separation module in an aircraft. The at least one mounting assembly includes a first end cap removably connected to the first end of the at least one air separation module, a second end cap removably connected to the second end of the at least one air separation module, and at least one bracket configured to removably connect one of the first end cap and the second end cap to an aircraft.

Technical features of the invention include an elegant multi-canister system in air separation systems of aircraft, including removable canisters that are not part of a frame assembly, and thus enabling simple installation and removal of the canisters. Further technical features of the invention include providing a common coupling mechanism enabling multiple canisters to be fluidly connected together to provide a modular and adjustable volume air separation system.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1A:
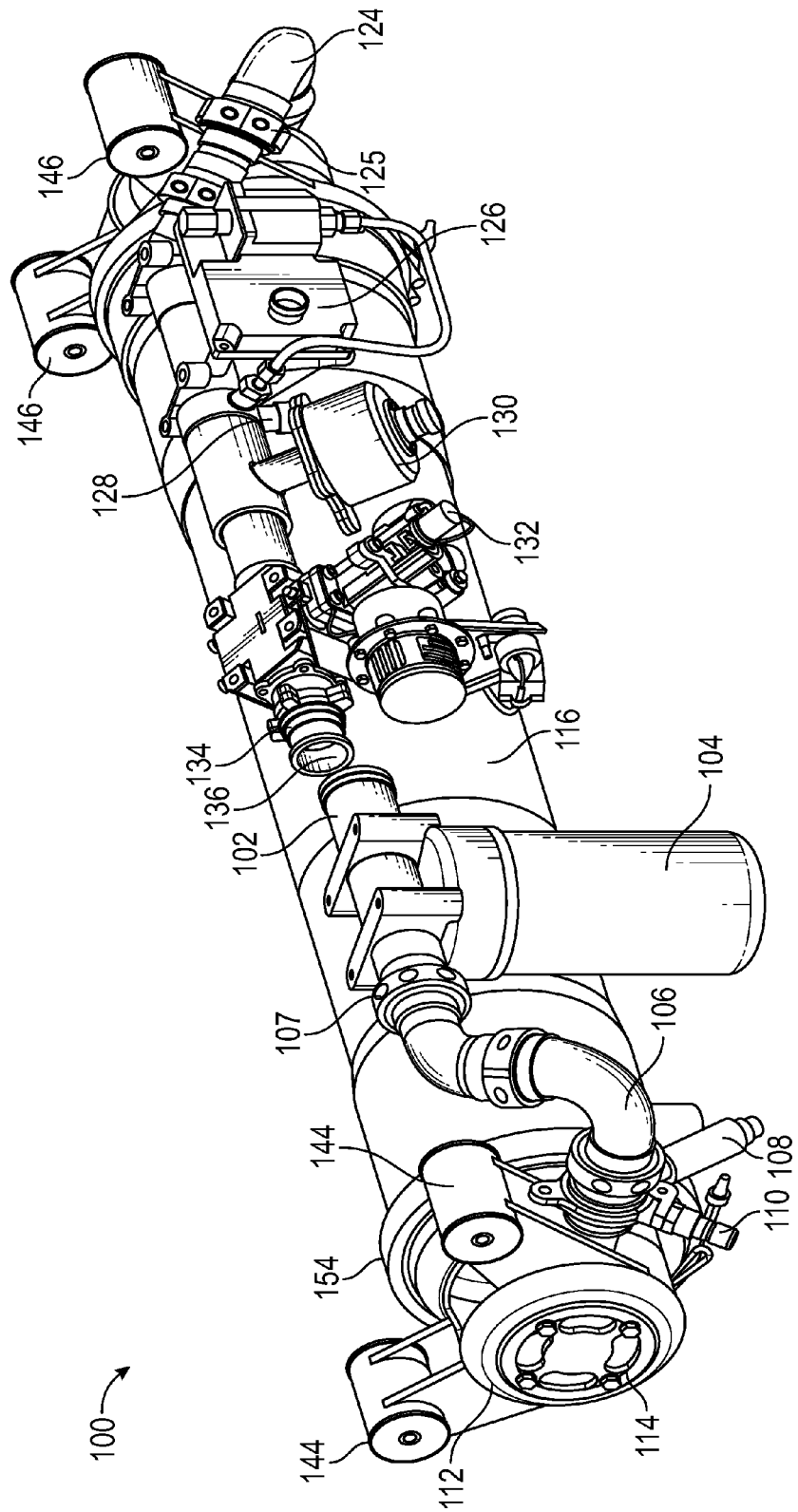
FIG. 1A is a schematic view of an air separation module in accordance with an exemplary embodiment of the invention.
Figure 1B:
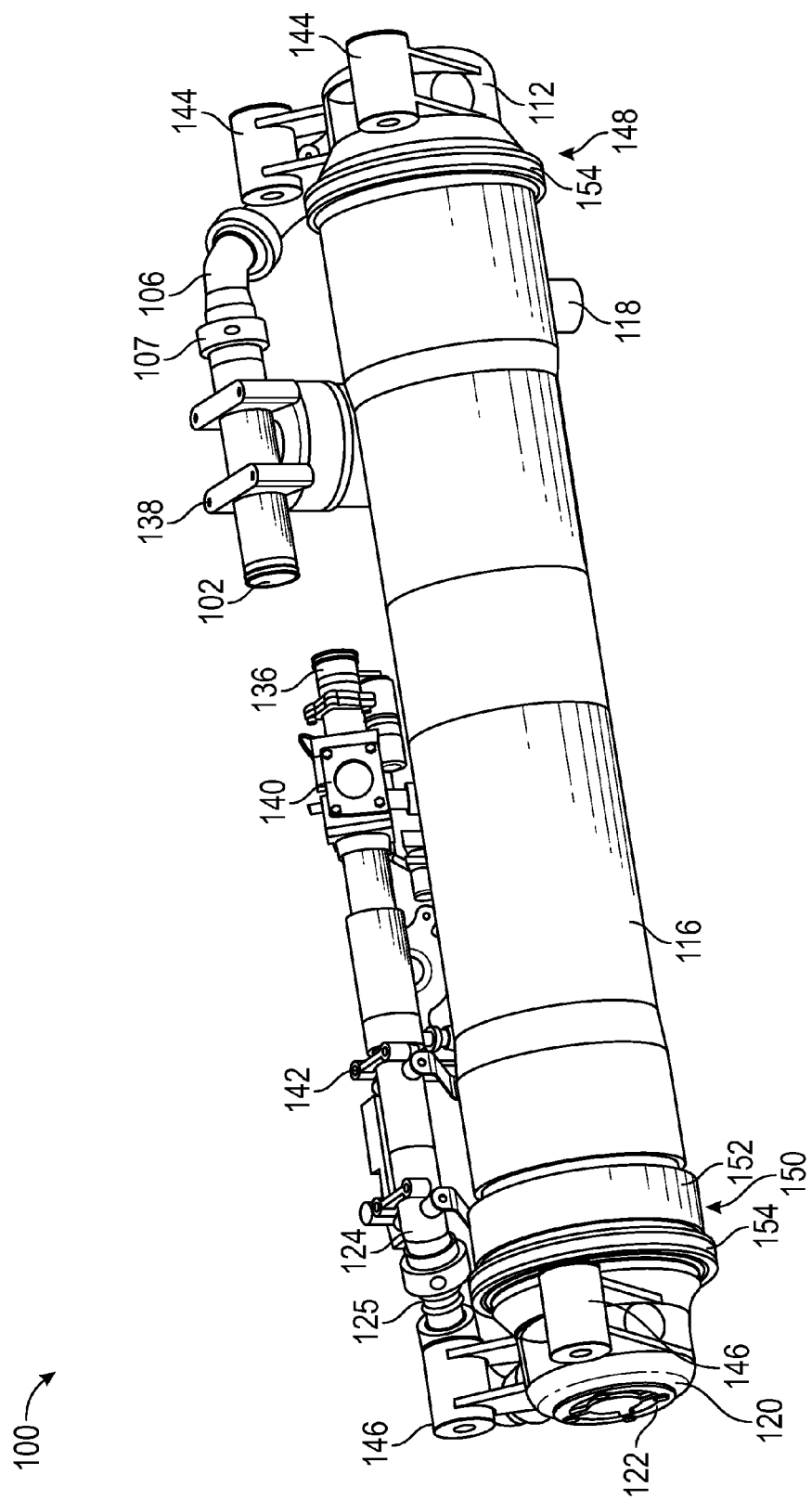
FIG. 1B is an alternate view of the air separation module of FIG. 1A.

FIG. 1A is a schematic view of an air separation module 100 in accordance with an exemplary embodiment of the invention and FIG. 1B shows an alternate view of the same air separation module 100. Bleed air enters the air separation module 100 at bleed air inlet 102 and passes through an ozone converter/filter 104. The air then passes through first end piping or ducting 106 including flexible joints 107 and a number of sensors, including pressure sensor 108 and temperature sensor 110. The air then passes into a first end cap 112 that includes a first transfer tube 114, described below. The first end cap 112 is configured to be in fluid communication with a canister 116 and defines a fluid flow path from the first end ducting 106 to the canister 116.

Thus, after passing through the end cap 112, the air flows into the air separation canister 116 which defines an interior chamber, shown in FIGS. 2A and 2B, that is configured to separate the air into component parts. For example, the air is separated into two fractions, a first fraction that is oxygen rich will exit the air separation module 100 at an overboard oxygen outlet 118 and a second fraction that is nitrogen rich passes out of the air separation module 100 at a second end cap 120 that defines a fluid flow path from the first canister 116 to second end piping or ducting 124.

The second end cap 120 includes a second transfer tube 122 and is substantially similar to first end cap 112 and first transfer tube 114. The nitrogen rich fraction will then flow through second end ducting 124 and flexible joints 125 and pass a number of sensors including an oxygen sensor 126, a temperature sensor 128, and a flow sensor 130. A flow control valve 132 is provided in the flow line prior to a check valve 134, which, in combination control, the flow of the separated nitrogen exiting the air separation module 100 at nitrogen outlet 136. The ducting 106, 124, filter 104, flexible joints 107, 125, inlet 102, sensors 108, 110, 126, 128, 130, valves 132, 134, and outlet 136 may be referred to as ducting elements or filter, valve, and duct assemblies. In general terms, the ducting elements are configured to supply and control the flow of bleed air to the air separation module 100, and configured to supply and control the flow of nitrogen rich air from the canister 116 to fuel tanks of an aircraft.

The air separation module 100 is configured to be mounted within an aircraft, and removably connect to various components of the aircraft, such as a flow line that will provide the nitrogen rich fraction to the fuel tanks to provide an inert gas thereto. The air separation module 100 is configured to be mounted to one or more brackets or other types of connectors or frames that are part of the aircraft. Accordingly, various fittings are provided on the components of air separation module 100 to enable mounting within an aircraft. For example, as shown in FIGS. 1A and 1B, air separation module 100 includes fittings or retaining members 138, 140, and 142, which are each part of the filter, valve, and duct assemblies that are separate from the canister 116. Although shown herein with three sets of retaining members 138, 140, and 142, those of skill in the art will appreciate that any number of retaining members may be used without departing from the scope of the invention. Further, as shown in FIGS. 1A and 1B, each retaining member 138, 140, and 142 includes four points of contact, however, those of skill in the art will appreciate that the number of points of contact may be varied without departing from the scope of the invention, and further the configuration of the contact points may be varied without departing from the scope of the invention.

Canister 116 is releasably retained between the first end cap 112 and the second end cap 120. First end cap 112 is mounted to a part of the aircraft by first structural attachment points 144, such as vibration isolators or other types of attachment means, and second end cap 120 is mounted to another part of the aircraft by second structural attachment points 146, such as vibration isolators. Thus, the first end cap 112, the second end cap 120, and the canister 116 retained therebetween form and/or add a structural component to the air separation module 100. At a first end 148, canister 116 removably engages or fits within or to a portion of the first end cap 112. At a second end 150, canister 116 removably engages or fits within or to a portion of the second end cap 120. As shown in FIG. 1B, canister 116 includes a collar 152 at the second end 150 which is configured to releasably engage with the second end cap 120. When installed, the first end 148 and the second end 150 of the canister 116 are releasably retained to the first end cap 112 and the second end cap 120, respectively, by use of locking mechanisms 154, such as V-band couplings, although other types of locking mechanisms, coupling devices, retaining devices, etc. may be used without departing from the scope of the invention. Further, although shown with two structural attachment points forming the first and second structural attachment points 144 and 146, those of skill in the art will appreciate that the number of structural attachment points may be varied without departing from the scope of the invention, and that the structural attachment points may be formed as vibration isolators or other types of attachment means, which may be rigid or permit movement of the end caps and canister.

Those of skill in the art will appreciate that variations of the configuration shown in FIGS. 1A and 1B may be possible without departing from the scope of the invention. Thus, these figures and explanations are presented merely for exemplary purposes and the invention is not limited thereby.

In operation, in order to remove a canister 116 from within the air separation module 100, the transfer tube 122 is removed from the end cap 120. Next, the locking mechanism 154 is removed from the engagement between the end cap 120 and the canister 116. Then the collar 152 is slid from a first, engaged position to a second, disengaged position, which allows for the canister 116 to move relative to the end cap 120. The canister 116 may then be dropped from the engaged position to a release position. In the release position, the first end 148 of the canister 116 may stay engaged or at least partially held or retained by the first end cap 112. However, in the release position, the second end 150 of the canister 116 is released from and not engaged with the second end cap 120. After the release position is obtained, the canister 116 can then be removed from the first end cap 112 and be moved to a removed position. Thus the canister 116 may be fully removed from the air separation module 100 while the other components may remain attached to the aircraft.

Those of skill in the art will appreciate that to install a canister within an air separation module as disclosed herein, the reverse process described above may be performed. Thus, (i) a canister may be engaged at a first end (in the release position), (ii) a second end of the canister moved upward into the engaged position, (iii) a collar slid from the disengaged position to the engaged position, (iv) a locking mechanism may be installed, and (v) the transfer tube may be installed and fastened to the end cap.

Those of skill in the art will also appreciate that the order of steps may be varied without departing from the scope of the invention. For example, although described above with the collar being moved prior to installing the transfer tube, these steps may be completed in any order.

Figure 2:
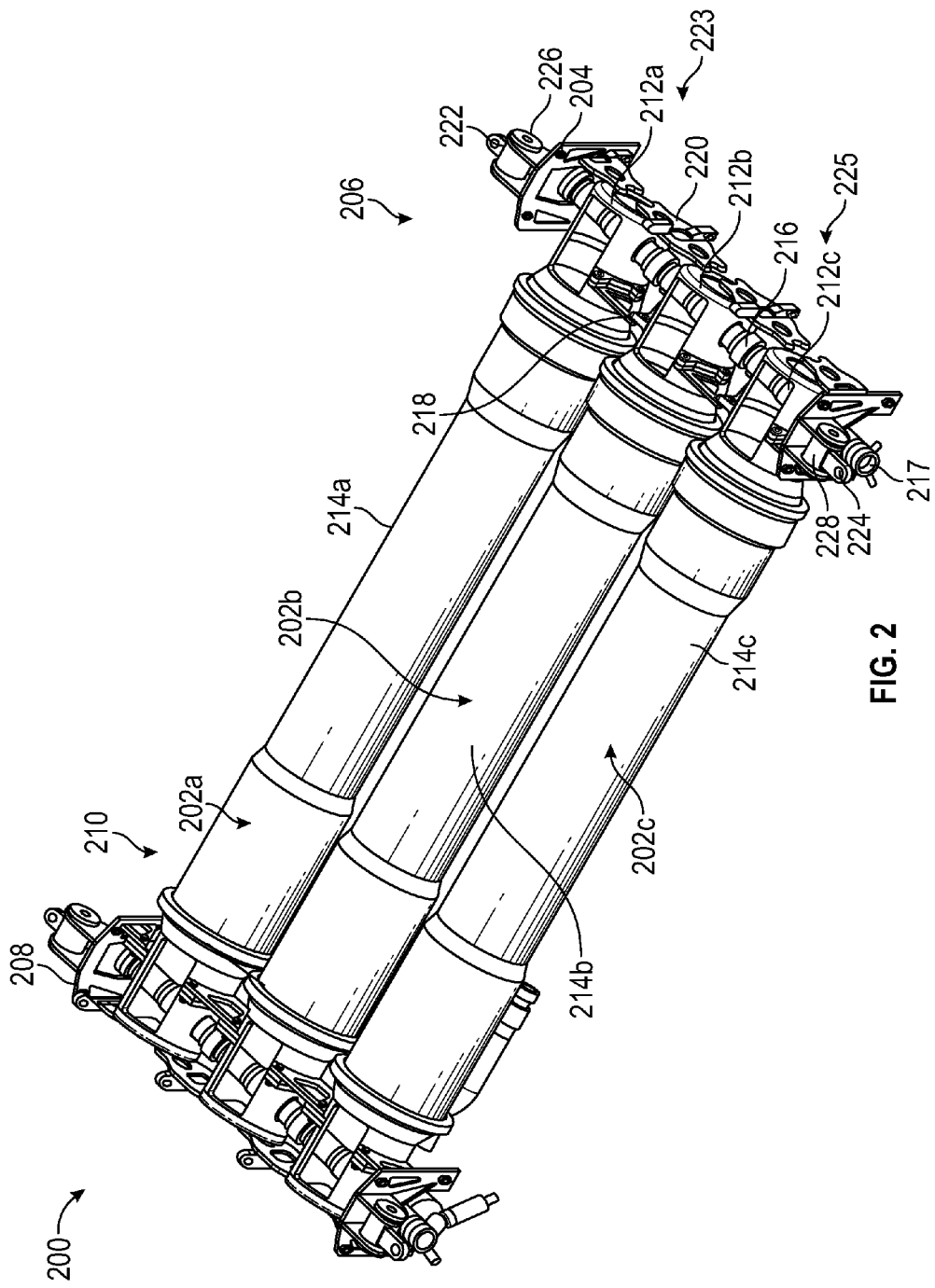
FIG. 2 is a schematic view of a plurality of canisters connected in accordance with an exemplary embodiment of the invention.

Turning now to FIG. 2, a multi-canister system in accordance with an exemplary embodiment of the invention is shown. Air separation assembly 200 includes three air separation modules 202a, 202b, and 202c. Each air separation module 202a, 202b, 202c may be substantially similar to the air separation module 100 of FIGS. 1A and 1B, and operate substantially similarly in terms of quick and easy installation and removal. It will be noted that the ducting, sensors, retaining members, and some other features described above with respect to FIGS. 1A and 1B are omitted from each of modules 202A, 202b, 202c. Those of skill in the art will appreciate that such features may be included in some embodiment, but in others, they may not be required, for example as shown in FIG. 2.

In the embodiment of FIG. 2, the three modules 202a, 202b, 202c are connected to each other by a first mounting assembly 204 at a first end 206 and a second mounting assembly 208 at a second end 210. The three modules 202a, 202b, 202c are retained between the first mounting assembly 204 and the second mounting assembly 208. The first and second mounting assemblies 204, 208 form a modular mounting assembly for mounting multiple canisters of an air separation system into an aircraft. First and second mounting assemblies 204, 208 are substantially similar to each other but are installed at opposite ends of the modules 202a, 202b, 202c. Thus, the primary difference between the first and second mounting assemblies 204, 208 is that one assembly may be connected and configured as an inlet side and the other may be connected and configured as an outlet side of the air separation assembly 200. The mounting assemblies 204, 208 are configured to mechanically and fluidly connect to various components and structures of an aircraft, such as a mounting frame or similar structure, and to fluid lines and/or ducting and related elements as discussed above with respect to FIGS. 1A and 1B.

The following description of first mounting assembly 204, at first end 206, applies equally to the construction and configuration of the second mounting assembly 208 at the second end 210. First mounting assembly 204 includes a number of end caps 212a, 212b, 212c that are configured to be attached to canisters 214a, 214b, 214c, respectively. Although shown with three canisters 214a, 214b, 214c, and associated components of the mounting assembly, those of skill in the art will appreciate that any number of canisters may be connected using embodiments of the invention, and thus the number of canisters is not limiting, and more or fewer than three canisters may be installed without departing from the scope of the invention.

The end caps 212a, 212b, 212c are configured to be fluidly connected by one or more connecting conduits 216. Conduits 216 can be configured to connect the end caps 212a, 212b, 212c and the canisters 214a, 214b, 214c in series to thus provide air to the air separation components, and to then distribute oxygen-rich and nitrogen-rich air appropriately. A fluid port 217, such as a fluid inlet or a fluid outlet, is provided at one side 225 of the mounting assembly 204, and another port (not shown) may be provided at the other side 223 of the mounting assembly 204. The fluid ports, such as fluid port 217, and conduit 216 enable the fluid flow as described with respect to FIGS. 1A and 1B, but with multiple canisters 214a, 214b, 214c.

The end caps 212a, 212b, 212c are each supported and mechanically connected to each other by one or more brackets. As shown in FIG. 2, first brackets 218 may be configured at a first position, such as a canister side or interior location with respect to the canisters and on the end cap. Second brackets 220 may be configured at a second position, such as an exterior location or side with respect to the canisters and on the end cap. The brackets 218, 220 are configured to modularly connect the air separation modules 202a, 202b, 202c to form the air separation assembly 200 with three canisters 214a, 214b, 214c, thus enabling a selection of volume for the air separation system. Specifically, a user can change the number of canisters installed in an air separation system to provide adequate air separation, without increasing the weight of the aircraft significantly, or, at least, minimizing the amount of weight that is installed on the aircraft for air separation purposes.

Also shown in FIG. 2 are mounts 222 and 224 which are configured to enable the mounting assembly 204 to be mounted to components of an aircraft. Mount 222 is located on a first side 223 of the mounting assembly 204, and mount 224 is located on a second side 225 of the mounting assembly 204. Each of the mounts 222, 224 include vibration isolators 226, 228, respectively, that are configured to isolate the air separation assembly 200 from vibrations of the aircraft to which the assembly 200 may be mounted or installed. As described above with respect to FIGS. 1A and 1B, the combination of end caps and canisters, in accordance with embodiments of the invention, provide a structural element to the air separation assembly 200, once connected, and thus an integral structural component can be formed without the need of an independent frame for the air separation system.

Figure 3:
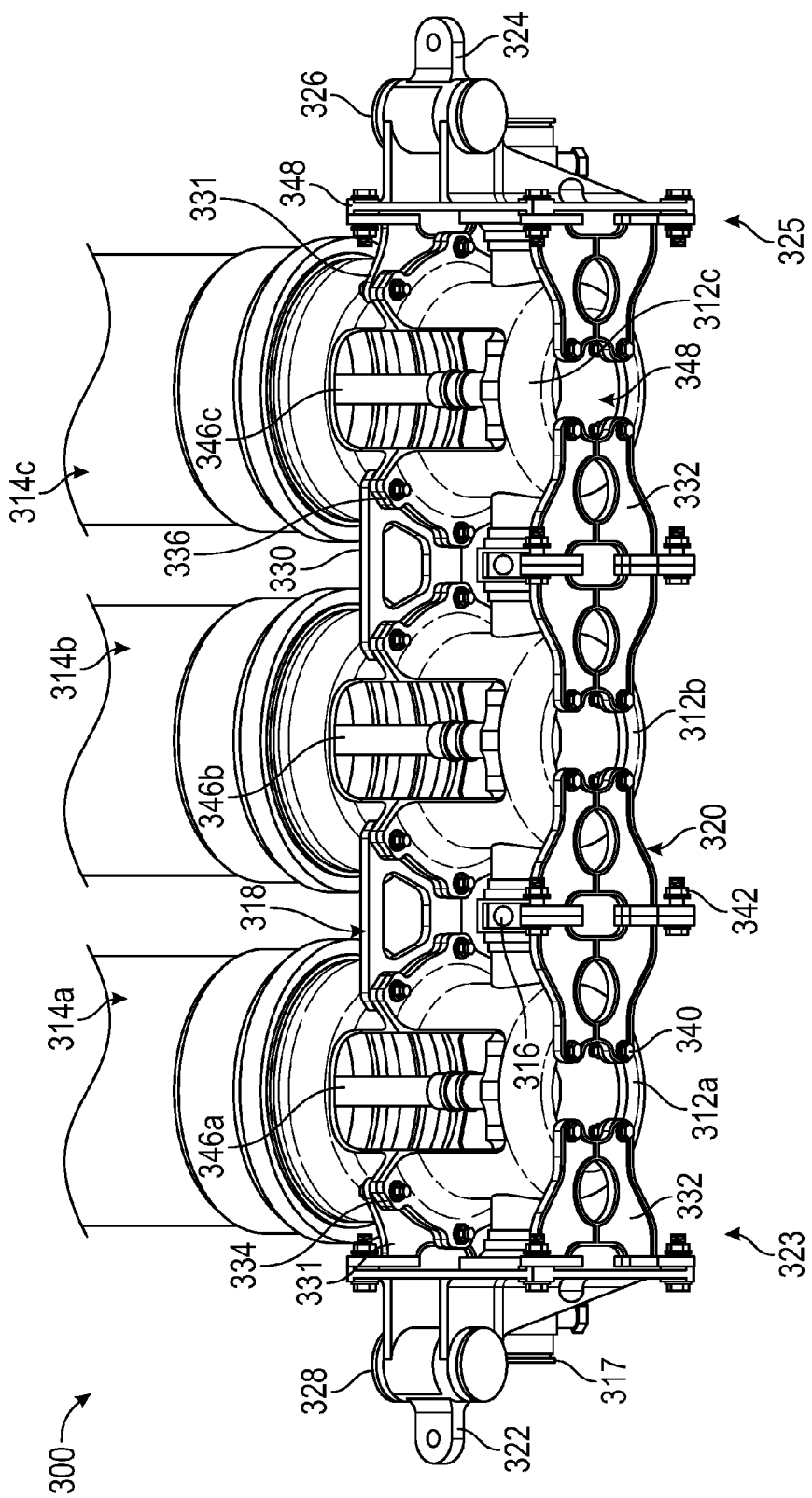
FIG. 3 is a detailed view of modular installation components in accordance with an exemplary embodiment of the invention.

Turning now to FIG. 3, a detailed schematic view of a mounting assembly 300 is shown. Mounting assembly 300 removably connects to the ends of canisters 314a, 314b, 314c. Mounting assembly 300 is substantially similar to the mounting assemblies of FIG. 2, and thus like features are labeled with the same reference numbers, but preceded by a "3" rather than a "2."

End caps 312a, 312b, 312c are removably and releasably connected to ends of canisters 314a, 314b, 314c, respectively. This enables the removal and/or installation of a single canister at a time, without the requirement to remove all canisters or a structural frame when changing a single canister. The end caps 312a, 312b, 312c are mechanically connected to each other by means of first bracket 318 and second bracket 320. First bracket 318 may be formed from one or more first braces 330 that connect adjacent end caps and/or one or more braces 331 configured to connect an end cap with a mount 322, 324, as shown. Similarly, second bracket 320 may be formed of one or more second braces 332 that connect adjacent end caps and/or an end cap with a mount 322, 324, as shown. A plurality of fasteners 334, 336, 338, 340, 342 are provided to connect the various components together. The fasteners may be bolts, screws, lock-pin configurations, and/or other types of fasteners known in the art.

As shown in FIG. 3, the conduit 316 fluidly connects adjacent end caps, and, further, fluidly connects the mounting assembly to a fluid port 317 on a first side 323 of the mounting assembly 300. Fluid port 317 may be an inlet or an outlet, and is configured to connect to various components such as the ducting elements described above with respect to FIGS. 1A and 1B. A second fluid port, not shown, may be configured substantially similarly as port 317 and located at the second side 325 of the mounting assembly 300. Further, conduit 316 is connected to each of the canisters 314a, 314b, 314c by means of a respective connecting tube 346a, 346b, 346c. Although not shown in FIG. 3, in some embodiments, a transfer tube may be inserted into an aperture 348 in the end caps 312a, 312b, 312c and mounted thereto, e.g., as shown in FIGS. 1A and 1B. The transfer tube may be configured to fluidly connect the conduit 316 to the interior ports on either end of the canisters 314a, 314b, 314c.

The mounting assembly 300 allows for modularity in an air separation system of an aircraft. Specifically, because the mounting assembly is modular, i.e., includes adjustable brackets, conduits, mounts, end caps, etc., any number of modules may be connected. Simply by adjusting the brackets and related fasteners, a user can quickly change a single canister in a multi-canister system or may easily add or remove a canister from a system permanently, without requiring significant changes to the connections to the aircraft.

Advantageously, in accordance with various embodiments of the invention, a modular air separation system is provided. Further, because systems described herein are modular, embodiments of the invention provide a simple and elegant system of removing, replacing, and/or installing individual canisters within the air separation system, without the requirement to remove an entire frame assembly. Further, because the system of embodiments of the invention is modular, the number of canisters provided in a particular application may be easily adjusted to cater to the particular needs and requirements of that application.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments and/or features.

For example, it is noted that the end caps of FIGS. 1A and 1B are different than the end caps of FIGS. 2 and 3. Although two types of end caps are shown in this disclosure, those of skill in the art will appreciate that the configuration and structure of the end caps may be varied or changed without departing from the scope of the invention.

Further, as noted above, the number of canisters, and associated components may be varied depending on the needs, requirements, or desires of a particular application, and those of skill in the art will appreciate that the numbers discussed and shown herein are merely provided for exemplary and explanatory purposes and the invention is not limited thereby.

Accordingly, the invention is not to be seen as limited by the foregoing description, but is only limited by the scope of the appended claims.

What is claimed is:
1. An air separation system comprising:
at least one air separation module having a first end and a second end; and
at least one mounting assembly removably connected the at least one air separation module and configured to mount the at least one air separation module in an aircraft, the at least one mounting assembly comprising:
a first end cap removably connected to the first end of the at least one air separation module, the first end cap having a first cap end configured to connect to the first end of the at least one air separation module and a second cap end opposite the first cap end;
a second end cap removably connected to the second end of the at least one air separation module; and
a first one bracket configured to removably connect the first end cap to an aircraft, the first bracket comprising a first brace configured at the first cap end and a second brace configured at the second cap end, wherein each of the first brace and the second brace are configured to one of connect to an adjacent end cap or connect to a mount.

2. The air separation system of claim 1, wherein the at least one air separation module comprises a first air separation module and a second air separation module, the at least one mounting assembly further comprising:
a first end cap for each of the first and second air separation modules; and
a second end cap for each of the first and second air separation modules,
wherein the first brace of the first bracket removably connects the first end cap and the second end cap at the first cap ends of the first and second end caps and the second brace of the first bracket removably connects the first end cap and the second end cap at the second cap ends of the first and second end caps.

3. The air separation system of claim 2, the at least one mounting assembly further comprising at least one conduit configured to fluidly connect the first end caps of the first and second air separation modules.

4. The air separation system of claim 3, further comprising at least one fluid port configured to fluidly connect the first and second air separation modules to an air supply source.

5. The air separation system of claim 1, wherein the at least one mounting assembly comprises at least one vibration isolator.

6. The air separation system of claim 1, wherein the at least one mounting assembly comprises at least one first brace configured at a first position on the connected end cap and at least one second brace configured at a second position on the connected end cap.

7. The air separation system of claim 1, the at least one mounting assembly further comprising a conduit configured to fluidly connect at least one of the first end cap and the second end cap to an air supply source.

8. The air separation system of claim 1, wherein the at least one mounting assembly comprises a first mounting assembly configured to releasably mount the first end of the at least one air separation module to an aircraft and a second mounting assembly configured to releasably mount the second end of the at least one air separation module to the aircraft.

9. The air separation system of claim 1, wherein the at least one air separation module includes a releasably retained canister.

10. The air separation system of claim 1 as configured within an aircraft.

11. The air separation system of claim 1, the second end cap having a respective first cap end configured to connect to the second end of the at least one air separation module and a respective second cap end opposite the respective first cap end of the second end cap, the system further comprising:
a second bracket configured to removably connect the second end cap to the aircraft, the second bracket comprising a first brace configured at the first cap end of the second end cap and a second brace configured at the second cap end of the second end cap, wherein each of the first brace and the second brace of the second bracket are configured to one of connect to an adjacent end cap or connect to a mount.

* * * * *